Feb. 24, 1931.   R. E. SMITH   1,793,756
DUMP TRUCK
Filed Dec. 23, 1927   7 Sheets-Sheet 1

INVENTOR
RALPH E. SMITH,
BY Toulmin Toulmin,
ATTORNEYS

Feb. 24, 1931. R. E. SMITH 1,793,756
DUMP TRUCK
Filed Dec. 23, 1927 7 Sheets-Sheet 5

INVENTOR
RALPH E. SMITH
BY Toulmin & Toulmin
ATTORNEYS

Feb. 24, 1931.　　　　R. E. SMITH　　　1,793,756
DUMP TRUCK
Filed Dec. 23, 1927　　　7 Sheets-Sheet 6
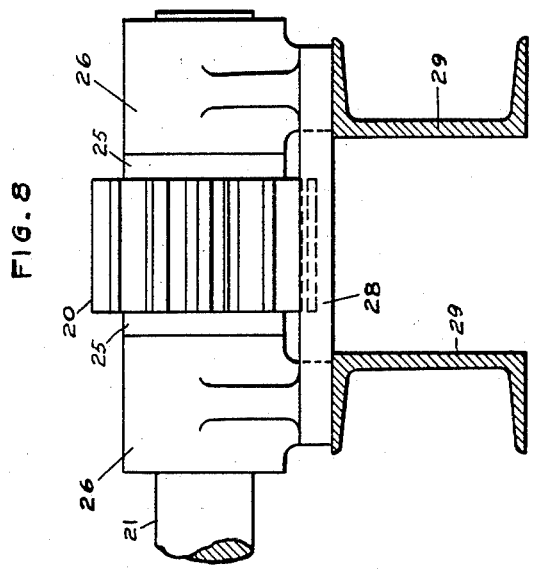
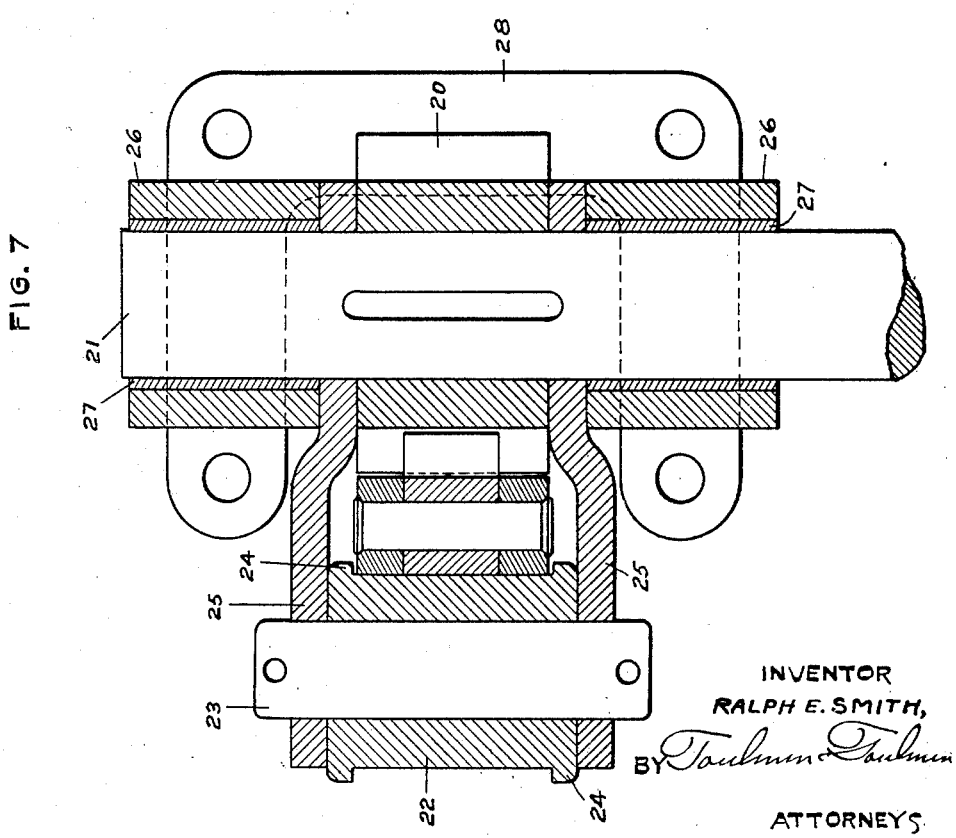
INVENTOR
RALPH E. SMITH,
BY Toulmin Toulmin
ATTORNEYS

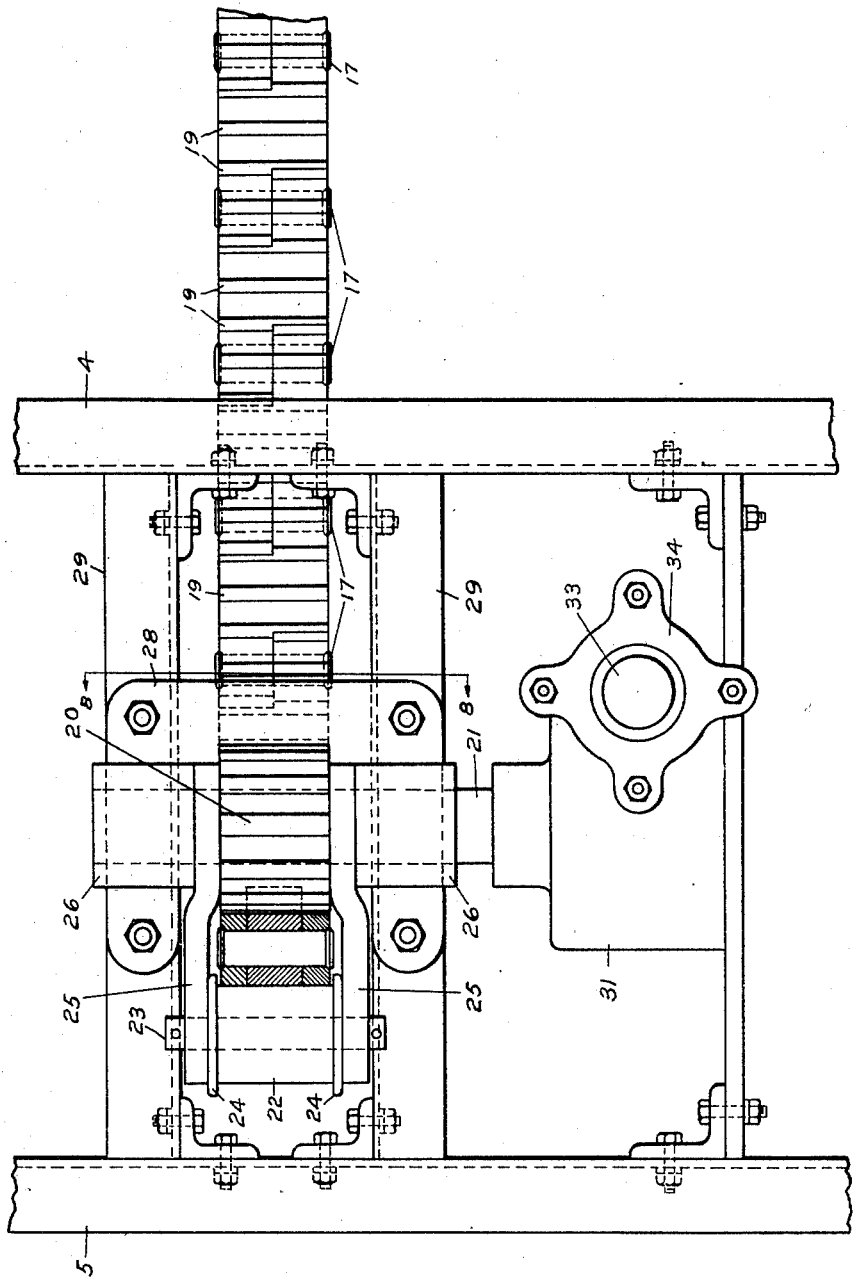

Patented Feb. 24, 1931

1,793,756

UNITED STATES PATENT OFFICE

RALPH E. SMITH, OF GALION, OHIO, ASSIGNOR TO THE GALION METALLIC VAULT COMPANY, OF GALION, OHIO, A CORPORATION OF OHIO

DUMP TRUCK

Application filed December 23, 1927. Serial No. 242,051.

My invention relates to dump trucks.

It is the object of my invention to provide a dump truck which may be positively elevated, controlled any point in its elevation, and positively lowered if desired.

It is a further object to provide a dump truck which may be of the counter-balance type, which will lower of its own weight when dumped, and the elevating mechanism will be adaptable to such an operation.

It is an object of my invention to provide positive power mechanism for elevating the load and providing a flexible gearing or gear chain which will be flexible for nesting in telescopic position, but which will be rigid for elevation of the dump body.

Referring to the drawings:

Figure 7 is a section on the line 7—7 of Figure 3.

Figure 8 is a section along the line 8—8 of Figure 9.

Figure 9 is a plan view of the forward end of the operating mechanism.

Figure 1:
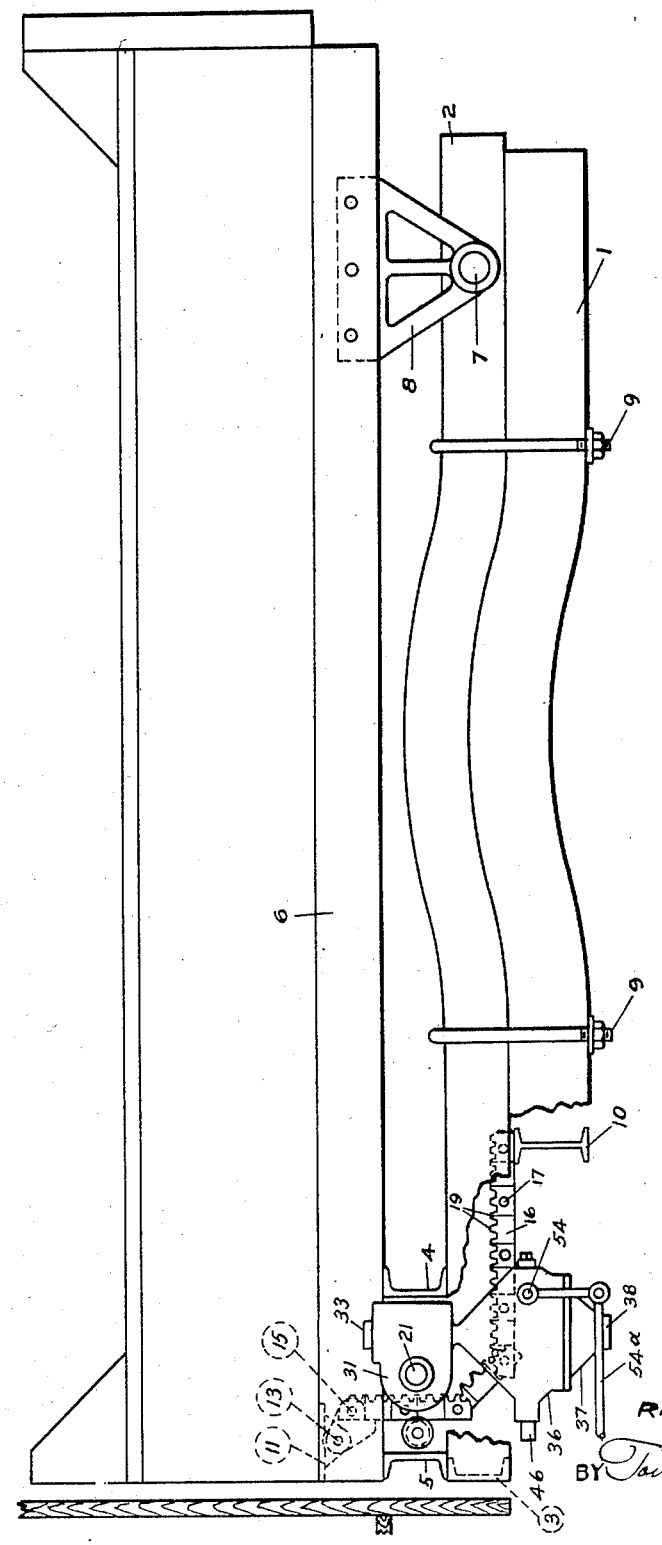
Figure 1 is a side elevation of the truck in loaded position.

Referring to the drawings, 1 designates a truck frame on which is mounted a supplementary frame 2 having interconnecting cross members 3. These cross members serve to provide a rigid supplementary frame for supporting the body and the pivots for the body and the associated gear mechanism.

Mounted upon the side frames 2 and transversely thereof are a pair of spaced channel iron members 4 and 5, upon which the body 6 rests at its forward end.

The rear end of the body is pivoted on the transverse pivotal support 7, mounted in the side frames 2 through the agency of the depending brackets 8.

It will be noted that the body with its supplementary frame and associated gear mechanism is completely fabricated into a unit which can be dropped upon the frame of the truck and attached thereto by any desired means, such as by U bolts 9.

The general scheme of operation of the dumping of the truck is to elevate its forward end through a power driven chain which is adapted to flex in one direction and to be inflexible in another direction, while having gear-engaging teeth on one side with a smooth surface on the other side for engagement with a guiding roller, or other similar means. Thus the chain when not in use for elevating the body is telescoped within the nesting space provided for it between the side frames 2, where it is suitably supported upon the supports 10. When the chain is elevated it is stiff and maintained in a rigid position and condition so as to elevate the forward end of the body 6.

A bracket 11 having spaced ears 12 is connected by a pivot pin 13 to a lug 14, which is connected by the pin 15 to the forward link 16 of the chain. This forward link 16 is one of a series of separate links which are connected together by the pivot pins 17. One side of the link is a flat surface 18 while the other is provided with teeth 19. The teeth 19 engage with the gear 20, which is driven by the shaft 21, while the other flat surface 18 of the link is engaged by the smooth surface roller 22. The links pass between the gear 20 and the roller 22 and are held in operative engagement with both. The roller 22 is mounted upon the shaft 23.

This roller 22 is provided with flanges 24 for engaging with the sides of the links. Links 25 connect the shafts 21 and 23, forming positioning members for the gear 20 and roller 22. The shaft 21 is mounted in collars 26, which are spaced apart on either side of the arms 25 and gear 20. These collars are provided with bearing sleeves 27. The two collars are mounted upon a common foundation 28, which in turn is mounted upon interconnecting fore and aft channel irons 29 which serve as supports for the gear mechanism.

The shaft 21 carries a worm wheel 30 within the housing 31. This worm wheel 30 is driven by the worm 32 mounted on the stub axle 33, which is journaled in the casing at one end at 34, in the casing at 35 and at the bottom of the gear box 36 in detachable gear box end 37, as at 38. Ball bearings 39 and 40 serve to take the thrust of the worm gear 32, while the ball bearings 41 and 42 take the thrust of the shaft adjacent the bevel gears 43 and 44, which are mounted thereon in spaced relationship in driving engagement with the pinion 45 mounted on the driving shaft 46, which is connected to the engine of the truck. 47 is a ball bearing adapted to take the thrust due to the action of the gear 45.

Between the two bevel gears 43 and 44 is a clutch consisting of a grooved member 48 having laterally projecting shoulders 49 for engaging with corresponding shoulders 49$^a$ of the respective bevel gears 43 and 44, which are adapted otherwise to turn loosely upon the shaft 33. This grooved clutch member 48 is splined upon the shaft 33 and turns with it. The clutch member 48 is moved laterally by the engagement in its groove of rollers 50 carried on stub shafts 51 at the upper ends of the arms 52 of the yoke 53. This yoke is mounted upon an operating shaft 54, which in turn is operated by the handle 54$^a$. The handle or connections to the handle may be carried to a point adjacent to the driver's seat of the truck.

This clutch member is maintained in either neutral or in either one of the driving positions by the spring-pressed plug 55, actuated by the spring 56 engaging with the sides of a notch end 57 of the depending latching member 58, which is formed as a part of the yoke 53.

It will be observed that this gear housing has a detachable bottom 37, held in position by the bolts 59 so that the structure may be readily assembled or disassembled and may be readily drained of lubricant and cleaned.

Method of operation

To operate this mechanism, the shaft 54 is shifted with the clutch to bring the clutch into engagement with one of the gears, either 43 or 44 depending upon the direction of movement of the truck body desired. Thereupon the chain will be fed by the gear 20 vertically if dumping is desired, while the chain will be guided by the engagement of the roller 22 with the back of the chain. The upper end of the chain is connected to the bracket 14 and is engaged with a shoulder 14$^a$ of the bracket to prevent buckling of the chain.

Figure 2:
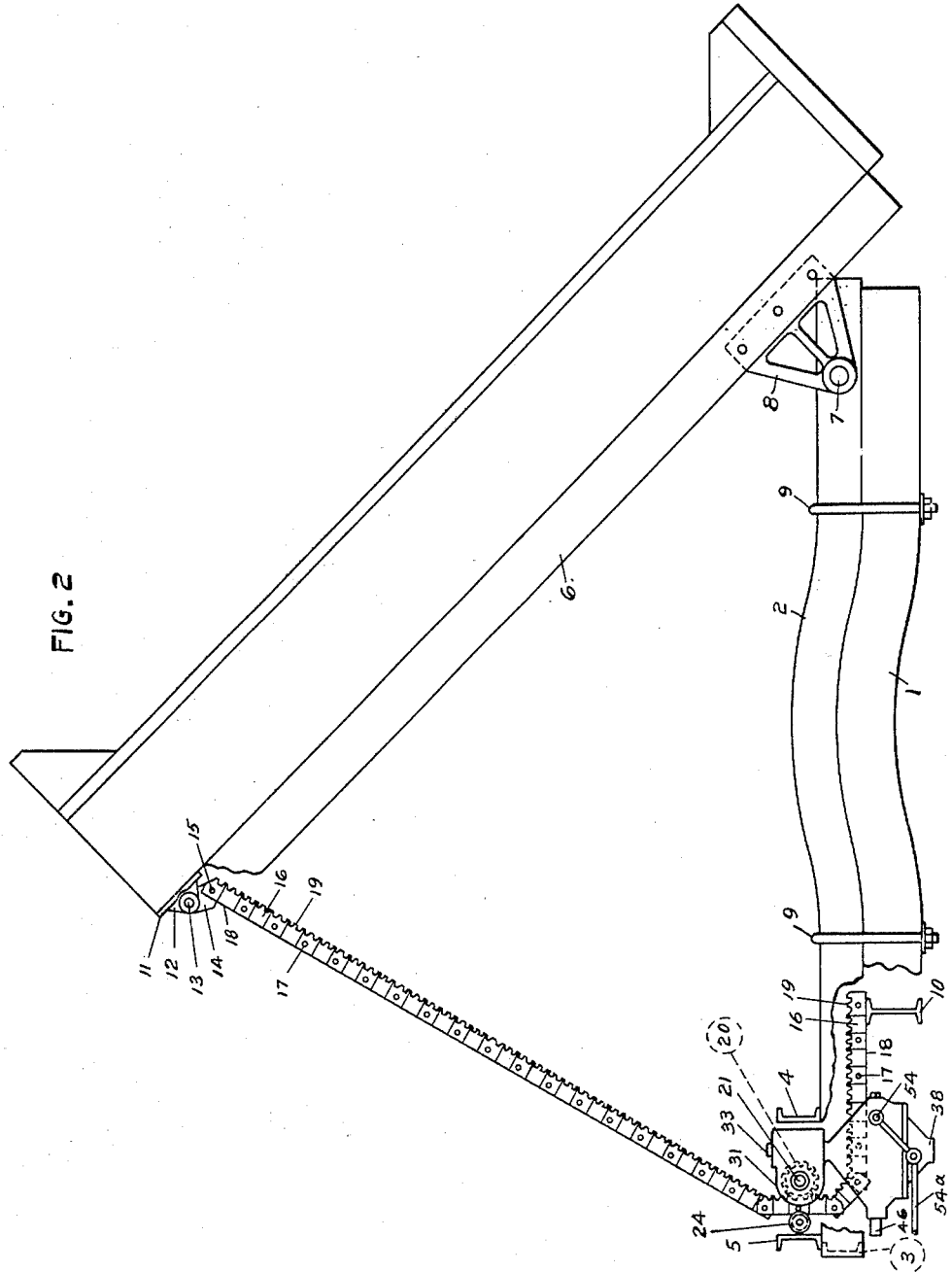
Figure 2 is a side elevation of the truck in elevated position.
Figure 3:
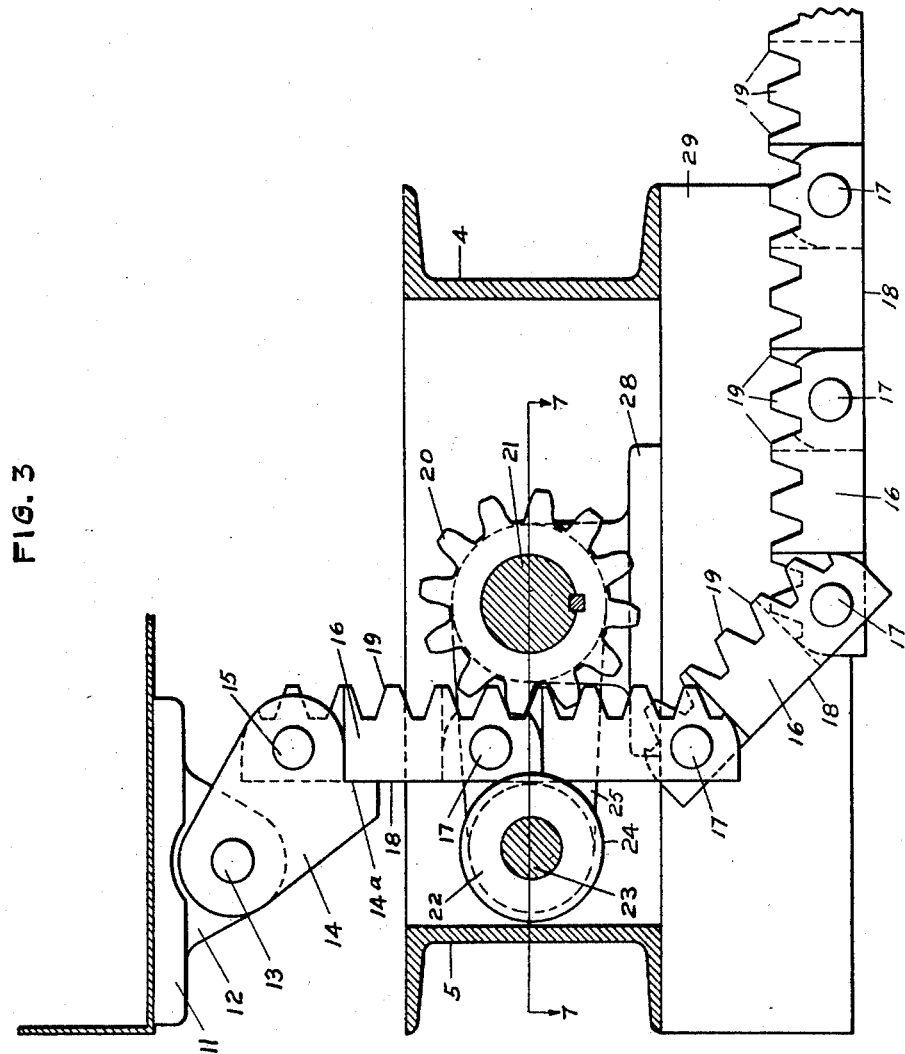
Figure 3 is a detail view with the shafts in section showing the arrangement of the elevating chain.
Figure 4:
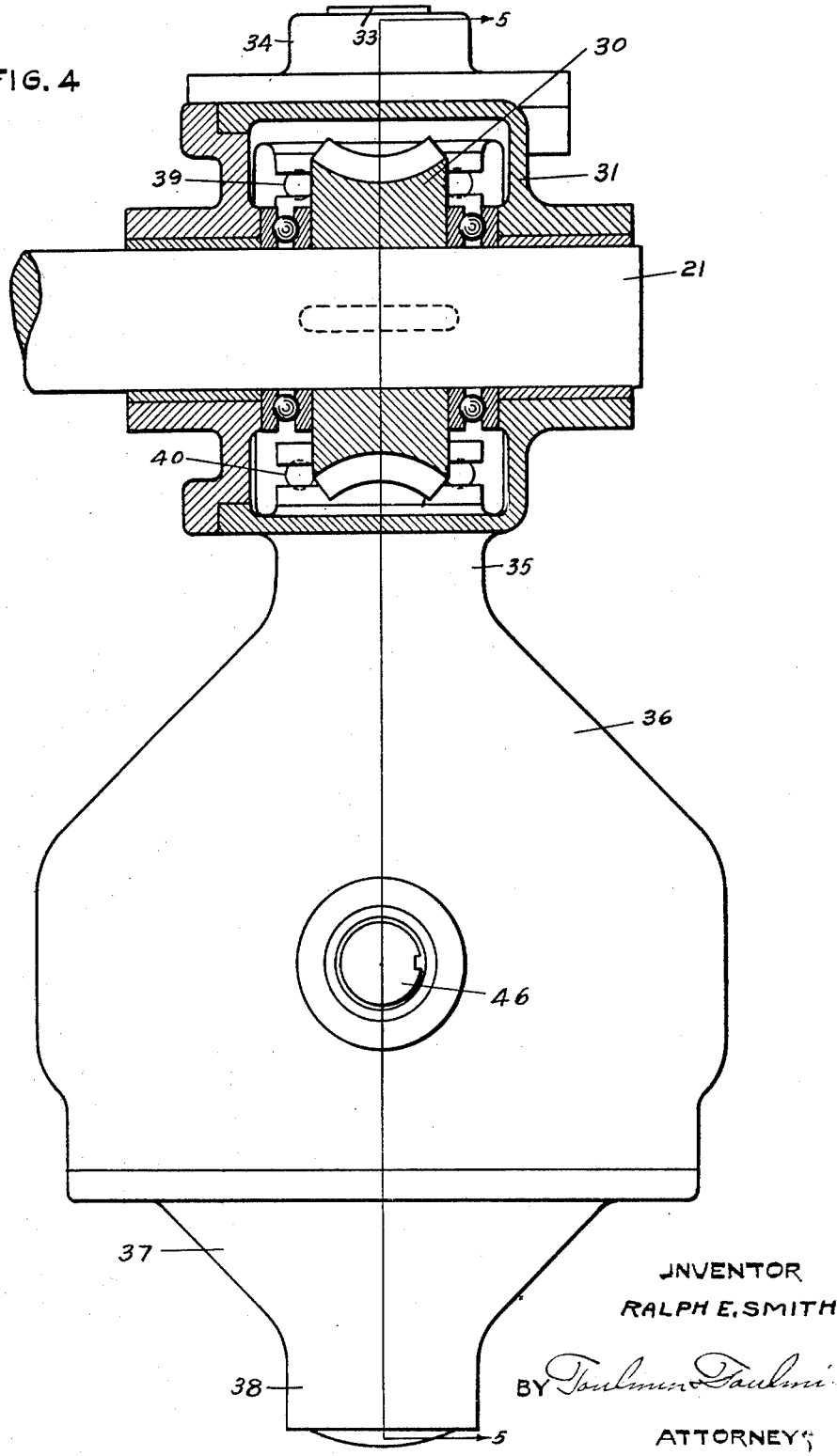
Figure 4 is a detail end elevation of the gearing with the worm driving gearing in section on line 4—4 of Figure 5.
Figure 5:
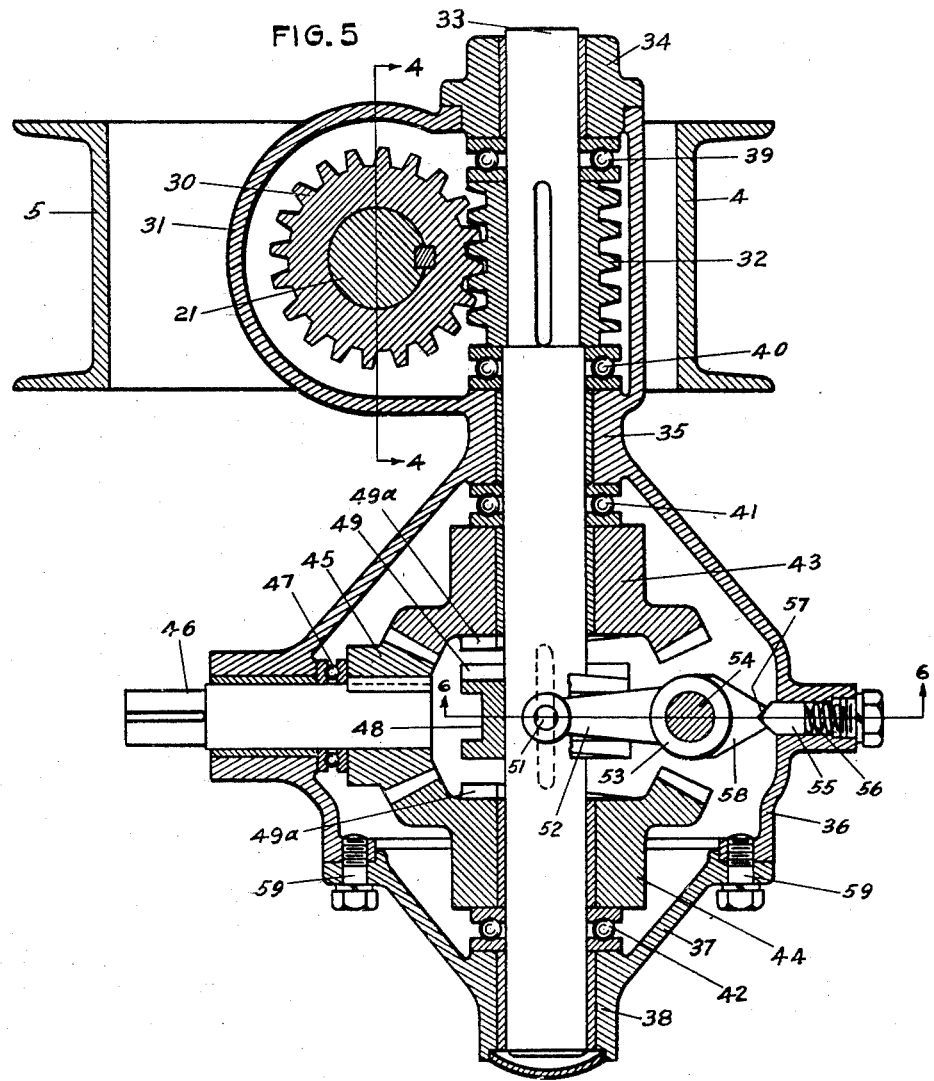
Figure 5 is a section on the line 5—5 of Figure 4.
Figure 6:
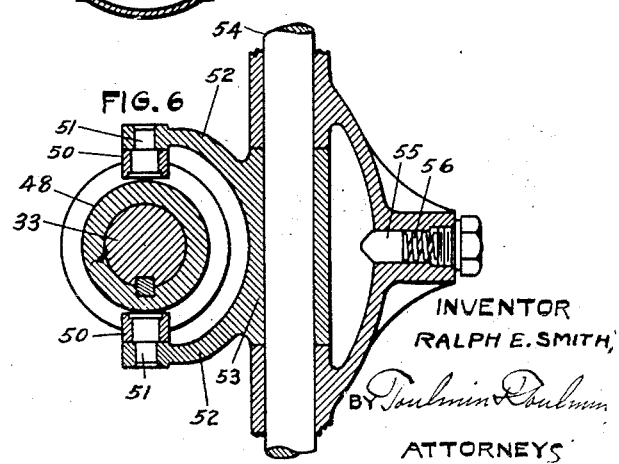
Figure 6 is a section on the line 6—6 of Figure 5.

As will be seen in Figure 2, as the pivotal point 15 moves in an arc to the left-hand, the constant tendency of the weight of the chain between its point of support between the gear and the roller and the point 15 is for the chain to drop continuously, or sag and this sagging tendency will keep the chain in its stiff position and prevent it from buckling, because if the chain passes over a line drawn between the pivotal center 15 and the point between the centers of the axles 21 and 23, it would tend to buckle and collapse.

Thus I am able to provide a lift that can be positively elevated and positively returned without the necessity of using a counter-balance truck body. I eliminate the necessity of having long elevating levers, shock absorbing cylinders and hydraulic elevating mechanism, all of which kinds of mechanism tend to put the truck body so high that it is top-heavy.

I desire to comprehend within my invention such modifications as may be clearly embraced within my claims and the scope of my invention.

Having thus fully described my invention, what I claim is new and desire to secure by Letters Patent, is:

1. In combination, a supplementary frame, a truck frame supporting said supplementary frame, a dump body pivoted on the supplementary frame, an actuating gear suspended from said supplementary frame, an articulated elevating and lowering member having teeth on one side adapted to engage with a part of said gear, means for attaching said articulated member to said dump body and said articulated member being adapted to flex in one direction and to be inflexible in the other direction, means including a swinging roller to guide and maintain said articulated member in inflexible position from the point of its engagement with the actuating gear to the point of its attachment to the body, and means for providing a nesting space for that portion of the articulated member which is inoperative.

2. In combination, a supplementary frame, a truck frame supporting said supplementary frame, a dump body pivoted on the supplementary frame, an actuating gear suspended from said supplementary frame, an articulated elevating and lowering member having teeth on one side adapted to engage with a part of said gear, means for attaching said articulated member to said dump body and said articulated member being adapted to flex in one direction and to be inflexible in the other direction, means including a swinging roller to guide and maintain said articulated member in inflexible position from the point of its engagement with the actuating gear to the point of its attachment to the body, means for providing a nesting space for that portion of the articulated member which is inoperative, and means to render inoperative said actuating means.

3. In combination, a supplementary frame, a truck frame supporting said supplementary frame, a dump body pivoted on the supplementary frame, a gear suspended from said supplementary frame, an articulated elevating and lowering member having teeth on one side adapted to engage with a part of said gear, means for attaching said articulated member to said dump body and said articulated member being adapted to flex in one direction and to be inflexible in the other direction, means including a swinging roller to guide and maintain said articulated member in inflexible position from the point of its actuation to the point of its attachment to the body, means for providing a nesting space for that portion of the articulated member which is inoperative, means to render inoperative said actuating means, and means to control said means for determining the direction of movement of the articulated means.

4. In combination, a main frame, a supplementary frame, a dump body pivoted on the supplementary frame, spaced transverse members on the supplementary frame for supporting the forward end of the dump body, a toothed member attached to the forward end of the dump body, adapted to be nested within said supplementary frame when in inoperative position, a transverse shaft located between said body and said supplementary frame, a pinion thereon for engaging the said member, fore and aft supporting members adapted to support bearings for said transverse shaft carrying said pinion, links carried by said shaft for supporting a roller, and a grooved roller for engaging with the one wall of said toothed member for guiding it into engagement with said pinion.

5. In combination, a supporting frame, a dump body pivoted thereon at one end thereof, transverse spaced members mounted across the other end in said frame adapted to support the other end of said body, a linked toothed elevating and lowering member attached to the forward end of said body adapted to pass between said transverse members to be nested in said frame, a pinion engaging said toothed member, a grooved roller adapted to engage the other side of said pinion, a transverse shaft located between said transverse members and parallel therewith carrying said pinion, fore and aft supporting members between the sides of said frame supported by said transverse members, bearing sleeves mounted thereon for supporting the shaft carrying said pinion, link members connecting said shaft and said roller, and means for driving said transverse shaft in either direction.

In testimony whereof, I affix my signature.

RALPH E. SMITH.